(12) United States Patent
Abbrederis et al.

(10) Patent No.: US 12,164,957 B2
(45) Date of Patent: Dec. 10, 2024

(54) SYSTEM AND METHOD FOR AUTOMATED ONBOARDING

(71) Applicant: JPMorgan Chase Bank, N.A., New York, NY (US)

(72) Inventors: Michael Abbrederis, Winfield, IL (US); Nicholas Koch, Tinley Park, IL (US); Vishal Jha, Naperville, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 442 days.

(21) Appl. No.: 17/643,276

(22) Filed: Dec. 8, 2021

(65) Prior Publication Data

US 2023/0176902 A1    Jun. 8, 2023

(51) Int. Cl.
    *G06F 9/48*      (2006.01)
(52) U.S. Cl.
    CPC ................... *G06F 9/4881* (2013.01)
(58) Field of Classification Search
None
See application file for complete search history.

(56) References Cited

U.S. PATENT DOCUMENTS

| | | | | |
|---|---|---|---|---|
| 6,876,997 B1* | 4/2005 | Rorex | ............. | G06Q 30/0277 705/37 |
| 7,844,966 B1* | 11/2010 | Chan | ............. | G06Q 10/0631 718/101 |
| 8,078,533 B1* | 12/2011 | Martin | ............. | G06Q 20/102 705/40 |
| 9,686,359 B1* | 6/2017 | Ben Dayan | ......... | H04L 43/0882 |
| 11,151,660 B1* | 10/2021 | Harding | ............. | G06Q 40/08 |
| 2002/0049671 A1* | 4/2002 | Trende | ............. | H04L 9/40 705/40 |
| 2003/0014466 A1* | 1/2003 | Berger | ............. | G06F 9/468 718/102 |
| 2004/0091114 A1* | 5/2004 | Carter | ............. | G06F 21/606 380/259 |
| 2004/0236692 A1* | 11/2004 | Sellen | ............. | G06Q 20/108 705/45 |
| 2005/0027846 A1* | 2/2005 | Wolfe | ............. | G06F 8/61 717/176 |
| 2005/0204029 A1* | 9/2005 | Connolly | ............. | G06Q 40/04 709/223 |
| 2007/0162317 A1* | 7/2007 | Papili | ............. | G06Q 30/02 705/7.26 |
| 2008/0034001 A1* | 2/2008 | Noel | ............. | G06Q 10/00 |
| 2009/0077537 A1* | 3/2009 | Chung | ............. | G06F 11/3684 717/124 |

(Continued)

*Primary Examiner* — Adam Lee
(74) *Attorney, Agent, or Firm* — GREENBLUM & BERNSTEIN, P.L.C.

(57) ABSTRACT

A method for performing automated onboarding of clients in a UAT (user acceptance testing) setup is provided. The method includes receiving a request to onboard a plurality of clients for setting up the UAT, and establishing a task for each of the plurality of clients. The method further includes adding details of each of the verified tasks for the plurality of clients into a mainframe file as one batch job, and submitting the batch job for generating all scripts in separate sets for onboarding the plurality of clients. Lastly, the method includes scheduling execution of the all of the scripts included in the batch job in a single iteration for onboarding of the batch of clients for the UAT.

20 Claims, 7 Drawing Sheets

(56) References Cited

U.S. PATENT DOCUMENTS

| | | | |
|---|---|---|---|
| 2009/0100017 A1* | 4/2009 | Graves | G06Q 40/02 |
| 2011/0166869 A1* | 7/2011 | Froelich | H04L 63/08 |
| | | | 705/1.1 |
| 2011/0166911 A1* | 7/2011 | Newman | G06Q 30/02 |
| | | | 705/7.33 |
| 2012/0209557 A1* | 8/2012 | Crandall | G05B 19/41885 |
| | | | 702/123 |
| 2015/0046351 A1* | 2/2015 | Tayebnejad | G06Q 30/0185 |
| | | | 705/318 |
| 2015/0332252 A1* | 11/2015 | Shahrokhi | G06Q 20/3278 |
| | | | 705/41 |
| 2015/0348182 A1* | 12/2015 | Cismas | G06Q 40/02 |
| | | | 705/35 |
| 2016/0072899 A1* | 3/2016 | Tung | H04L 41/145 |
| | | | 709/223 |
| 2016/0274927 A1* | 9/2016 | Savant | G06F 9/45558 |
| 2017/0068525 A1* | 3/2017 | Johnston | G06F 8/60 |
| 2017/0161728 A1* | 6/2017 | Satyanarayan | G06Q 20/363 |
| 2017/0286864 A1* | 10/2017 | Fiedel | G06F 9/546 |
| 2018/0247648 A1* | 8/2018 | Nadimpalli | G10L 15/22 |
| 2018/0276079 A1* | 9/2018 | Zhang | G06F 16/2282 |
| 2019/0025856 A1* | 1/2019 | Turato | H04L 9/3234 |
| 2019/0260824 A1* | 8/2019 | Pitio | H04L 67/10 |

\* cited by examiner

300

SYSTEM AND METHOD FOR AUTOMATED ONBOARDING

TECHNICAL FIELD

This disclosure generally relates to a system and method for providing a more efficient UAT (user acceptance testing) setup, and more particularly to automating client onboarding in the UAT setup.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Client onboarding process is broadly divided into two types, namely UAT (User Acceptance Testing) setup and product implementation. The UAT setups generally require a team of application developers or implementers to create scripts for onboarding of each client. Depending on services required, 3-4 scripts may prepared for each client onboarding. For a large organization, number of clients to be onboarded for a UAT setup may be large, such that generating 3-4 scripts for each client may constrain resources from performing other works. Further, as the generation of scripts is largely dependent on manual labor, manual errors may be inserted into the onboarding process further creating potential delays in the process.

SUMMARY

According to an aspect of the present disclosure, a method for performing automated onboarding of clients in a UAT setup is provided. The method includes receiving a request to onboard a plurality of clients for setting up the UAT; establishing a task for each of the plurality of clients; for each of the plurality of clients, performing a check for each of the established tasks for verification; adding details of each of the verified tasks for the plurality of clients into a mainframe file as one batch job; generating all scripts in separate sets in the one batch job for onboarding the plurality of clients; allocating, after the generating of all of the scripts for the onboarding of the plurality of clients, corresponding files for the onboarding of the plurality of clients; scheduling execution of the one batch job including all of the generated scripts; and executing the one batch job to onboard plurality of clients for the setting up of the UAT. Once UAT is satisfactorily setup, the setup information and/or configuration move into production to process daily transactions, including the client onboarding process.

According to another aspect of the present disclosure, the all of the scripts includes a first set of scripts, a second set of scripts and a third set of scripts, the first set of scripts is generated before the second set of scripts, and the second set of scripts is generated before the third set of scripts.

According to another aspect of the present disclosure, the method includes setting up request records with flag based options for the plurality of clients; and including the set request records in the one batch job.

According to yet another aspect of the present disclosure, the first set of scripts are for receiving a batch job file, the second set of scripts are for processing the batch job file, and the third set of scripts are for confirming processing of the batch job file.

According to another aspect of the present disclosure, each of the first set of scripts, the second set of scripts, and the third set of scripts is performed only once for the one batch job.

According to a further aspect of the present disclosure, the corresponding files of all of the generated scripts are identified and allocated by a machine learning algorithm.

According to yet another aspect of the present disclosure, a size of the one batch job is determined based on a number of requests for onboarding clients received within a predetermined period of time.

According to a further aspect of the present disclosure, a size of the one batch job is determined based on a machine learning algorithm.

According to another aspect of the present disclosure, the scheduling of the batch job is specified based on a machine learning algorithm.

According to a further aspect of the present disclosure, the method includes inputting, into a database, service details for each of the plurality of clients to be onboarded.

According to a further aspect of the present disclosure, the service details includes, for each of the plurality of clients added, at least a customer identifier.

According to a further aspect of the present disclosure, the customer identifier includes a routing number.

According to a further aspect of the present disclosure, the customer identifier includes a predetermined number of characters.

According to a further aspect of the present disclosure, each of the first set of scripts, the second set of scripts and the third set of scripts is generated once in the one batch job for the onboarding of the plurality of clients.

According to another aspect of the present disclosure, all of the scripts generated are job control language (JCL) scripts.

According to another aspect of the present disclosure, at least one of the scripts is generated based on the flag based options.

According to another aspect of the present disclosure, at least three sets of scripts for performing different operations are generated for the batch job, and one set of scripts is generated before another set is generated.

According to another aspect of the present disclosure, multiple batch jobs are executed in a day, each of the batch jobs being defined by a predefined schedule.

According to another aspect of the present disclosure, a system for performing automated onboarding of clients in a UAT (user acceptance testing) setup is disclosed. The system includes a processor, a memory and a communication circuit. The processor is configured to receive a request to onboard a plurality of clients for setting up the UAT; establish a task for each of the plurality of clients; for each of the plurality of clients, perform a check for each of the established tasks for verification; add details of each of the verified tasks for the plurality of clients into a mainframe file as one batch job; generate all scripts in separate sets in the one batch job for onboarding the plurality of clients; allocate, after the generating of all of the scripts for the onboarding of the plurality of clients, corresponding files for the onboarding of the plurality of clients; schedule execution of the one batch job including all of the generated scripts; and execute the one batch job to onboard plurality of clients for the setting up of the UAT.

According to another aspect of the present disclosure, a non-transitory computer readable storage medium that stores a computer program for performing automated onboarding of clients in a UAT (user acceptance testing)

setup, the computer program is disclosed. The computer program, when executed by a processor, causing a system to perform a process including receiving a request to onboard a plurality of clients for setting up the UAT; establishing a task for each of the plurality of clients; for each of the plurality of clients, performing a check for each of the established tasks for verification; adding details of each of the verified tasks for the plurality of clients into a mainframe file as one batch job; generating all scripts in separate sets in the one batch job for onboarding the plurality of clients; allocating, after the generating of all of the scripts for the onboarding of the plurality of clients, corresponding files for the onboarding of the plurality of clients; scheduling execution of the one batch job including all of the generated scripts; and executing the one batch job to onboard plurality of clients for the setting up of the UAT.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
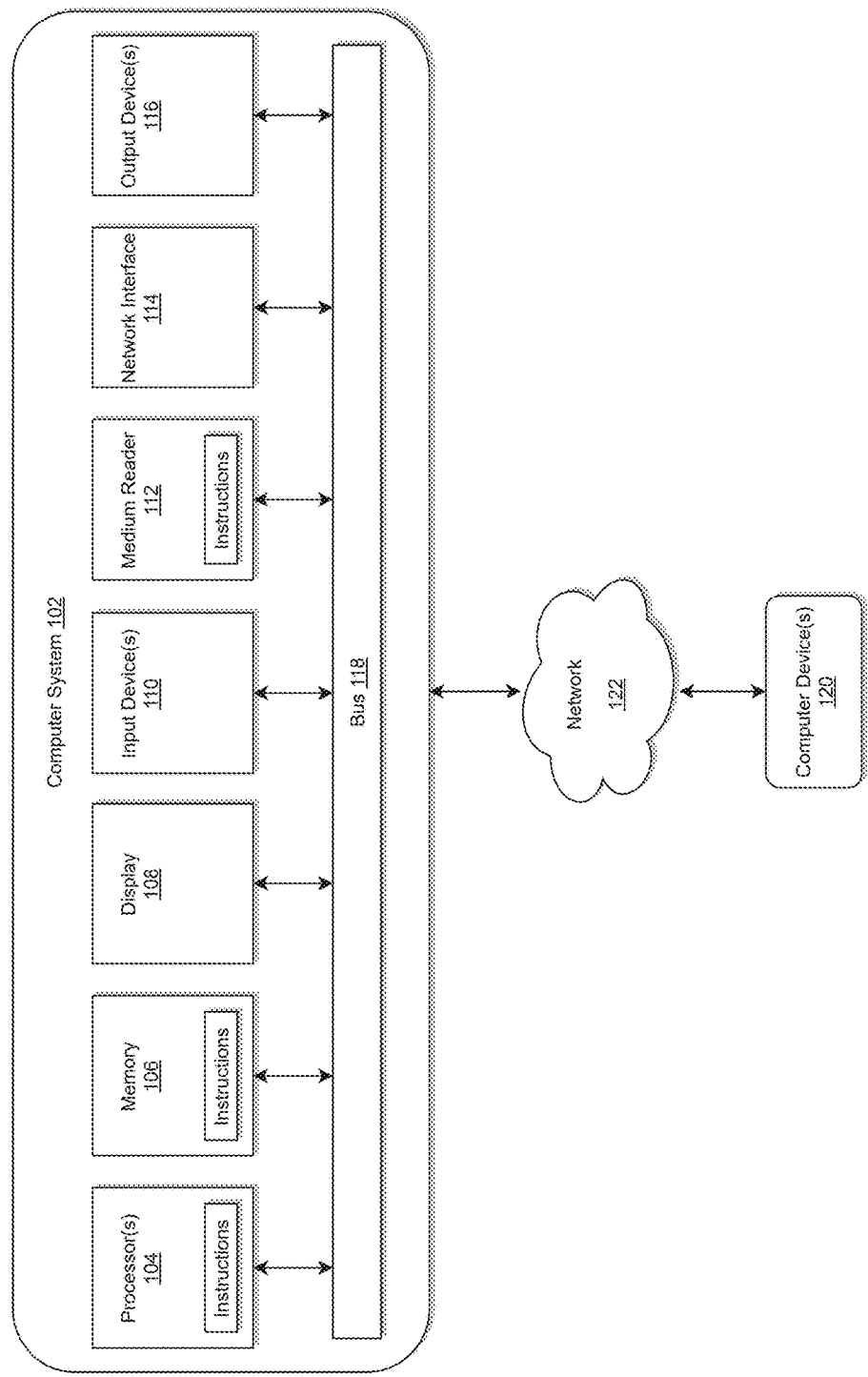
FIG. 1 illustrates a computer system for implementing an automated onboarding system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing an automated onboarding system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
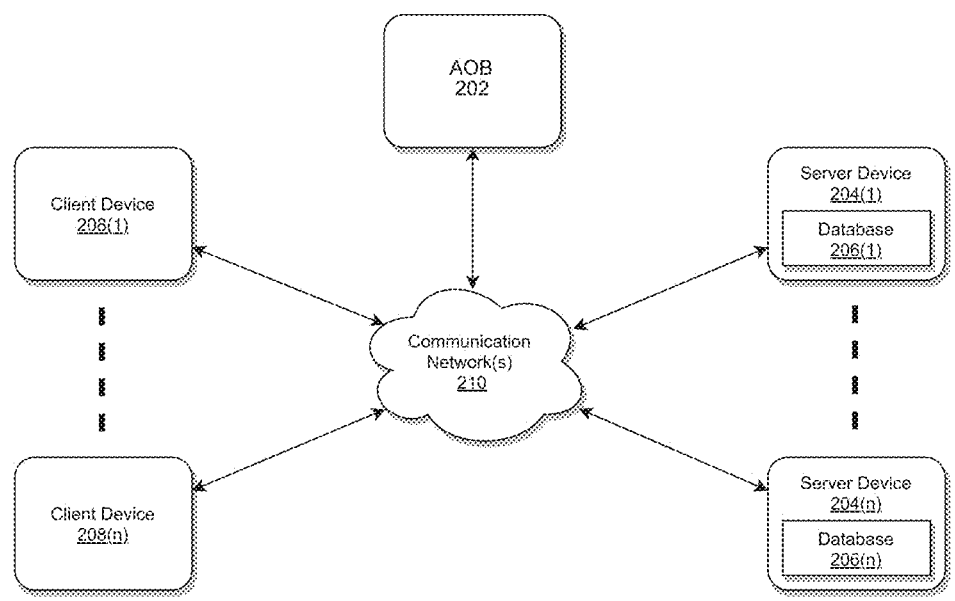
FIG. 2 illustrates an exemplary diagram of a network environment with an automated onboarding system in accordance with an exemplary embodiment.

FIG. 2 illustrates an exemplary diagram of a network environment with an automated onboarding system in accordance with an exemplary embodiment.

An automated onboarding (AOB) system 202 may be the same or similar to the computer system 102 as described with respect to FIG. 1.

The AOB system 202 may store one or more applications that can include executable instructions that, when executed by the AOB system 202, cause the AOB system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the AOB system 202 itself, may be located in virtual server(s) running in a cloud-based computing environment rather than being tied to one or more specific physical network computing devices. Also, the application(s) may be running in one or more virtual machines (VMs) executing on the AOB system 202. Additionally, in one or more embodiments of this technology, virtual machine(s) running on the AOB system 202 may be managed or supervised by a hypervisor.

In the network environment 200 of FIG. 2, the AOB system 202 is coupled to a plurality of server devices 204(1)-204(n) that hosts a plurality of databases 206(1)-206(n), and also to a plurality of client devices 208(1)-208(n) via communication network(s) 210. A communication interface of the AOB system 202, such as the network interface 114 of the computer system 102 of FIG. 1, operatively couples and communicates between the AOB system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AOB system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AOB system 202 may be a standalone device or integrated with one or more other devices or apparatuses, such as one or more of the server devices 204(1)-204(n), for example. In one particular example, the AOB system 202 may be hosted by one of the server devices 204(1)-204(n), and other arrangements are also possible. Moreover, one or more of the devices of the AOB system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AOB system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AOB system 202 that may efficiently provide a platform for implementing a cloud native AOB module, but the disclosure is not limited thereto.

The client devices 208(1)-208(n) may run interface applications, such as standard web browsers or standalone client applications, which may provide an interface to communicate with the AOB system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AOB system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AOB system 202, the server devices 204(1)-204(n), or the client devices 208(1)-208(n), for example, may be configured to operate as virtual instances on the same physical machine. For example, one or more of the AOB system 202, the server devices 204(1)-204(n), or the client devices 208(1)-208(n) may operate on the same physical device rather than as separate devices communicating through communication network(s) 210. Additionally, there may be more or fewer AOB systems 202, server devices 204(1)-204(n), or client devices 208(1)-208(n) than illustrated in FIG. 2. According to exemplary embodiments, the AOB system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
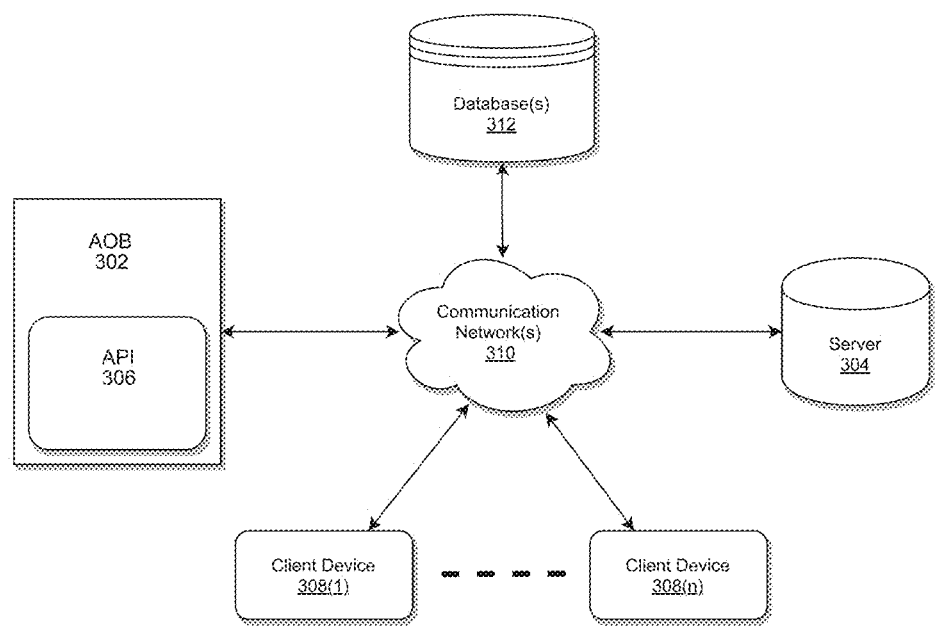
FIG. 3 illustrates a system diagram for implementing an automated onboarding system in accordance with an exemplary embodiment.

FIG. 3 illustrates a system diagram for implementing an automated onboarding system in accordance with an exemplary embodiment.

As illustrated in FIG. 3, the system 300 may include an AOB system 302 within which a group of API modules 306 is embedded, a server 304, a database(s) 312, a plurality of client devices 308(1) . . . 308(n), and a communication network 310.

According to exemplary embodiments, the AOB system 302 including the API modules 306 may be connected to the server 304, and the database(s) 312 via the communication network 310. Although there is only one database has been illustrated, the disclosure is not limited thereto. Any number of databases may be utilized. The AOB System 302 may also be connected to the plurality of client devices 308(1) . . . 308(n) via the communication network 310, but the disclosure is not limited thereto.

According to exemplary embodiment, the AOB system 302 is described and shown in FIG. 3 as including the API modules 306, although it may include other rules, policies, modules, databases, or applications, for example. According to exemplary embodiments, the database(s) 312 may be embedded within the AOB system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable AOB as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the AOB system 302. In this regard, the plurality of client devices 308(1) . . . 308(n) may be "clients" of the AOB system 302 and are described herein as such. Nevertheless, it is to be known and understood that the plurality of client devices 308(1) . . . 308(n) need not necessarily be "clients" of the AOB system 302, or any entity described in association therewith herein. Any additional or alternative relationship may exist between either or both of the plurality of client devices 308(1) . . . 308(n) and the AOB system 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the AOB system 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The AOB system 302 may be the same or similar to the AOB system 202 as described with respect to FIG. 2, including any features or combination of features described with respect thereto.

Figure 4:
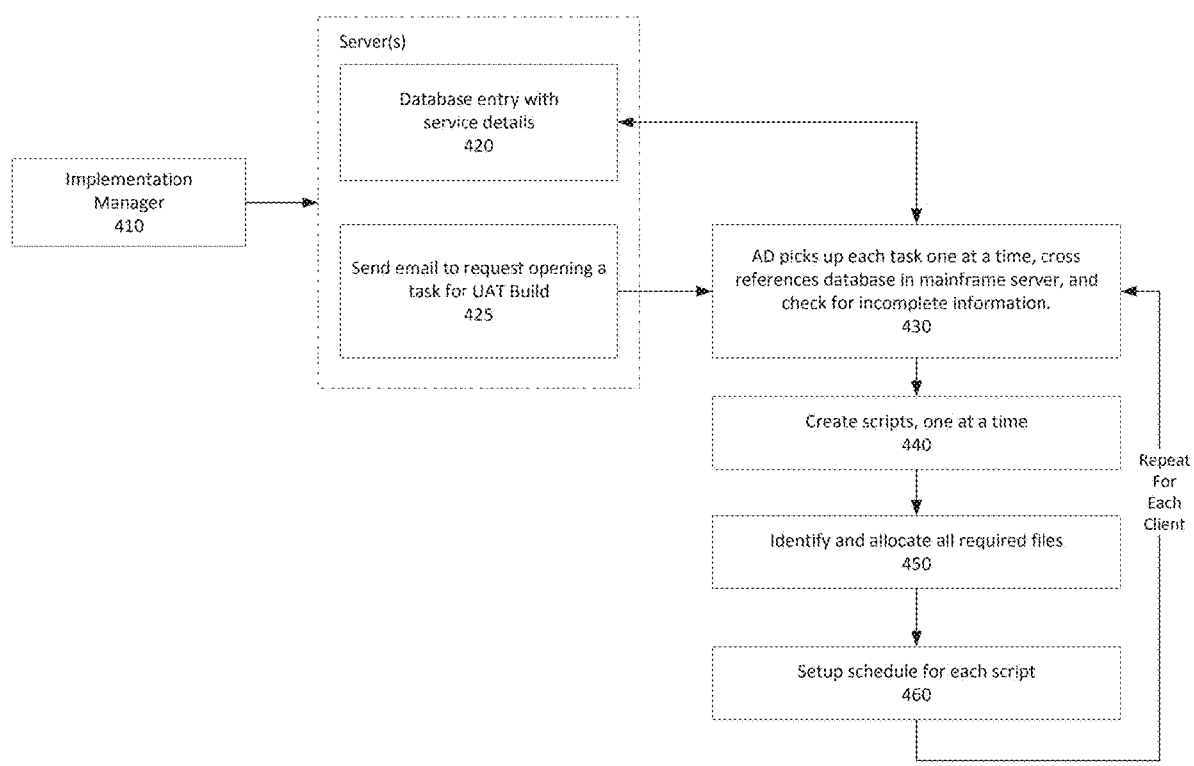
FIG. 4 illustrates a conventional process flow for performing client onboarding.

FIG. 4 illustrates a conventional process flow for performing client onboarding.

Prior to a client of an organization is recognized in an UAT environment, the respective client has to be onboarded to the UAT environment with corresponding attributes.

The onboarding process may include an implementation manager 410 generating a request to onboard clients for the UAT build, and transmitting the generated request, via an email, to one or more servers on a network, such as an internal server mailbox.

Further, one or more servers residing on the network may perform operation 420 to store information related to the request for onboarding the one or more clients. The operation 420 also may be executed in conjunction with operation 430 to further record or input service details associated with processing of tasks transmitted by the internal server mailbox. The service details may be added to the information related to the request for onboarding the one or more clients.

The internal server mailbox, upon receipt of the emailed request from the implementation manager 410, generates the request and sends it to a database instance. More specifically, the internal server mailbox performs operation 425 to send an email request for an opening of a task for the UAT build.

Upon receipt of the email transmitted in operation 425, the application development team performs each of operation 430, operation 440, operation 450 and operation 460 for every client to be onboarded. Accordingly, if fifty clients are to be onboarded, each of operation 430, operation 440, operation 450 and operation 460 may be sequentially performed for ten iterations for a total of two hundred operations.

In operation 430, the application development team picks up each onboarding task that was opened, one at a time, for processing of the respective onboarding task. Further, the application development team cross references a database residing in one or more servers on a network, and checks for incomplete information. Service details generated in operation 430 may be transmitted to the database for data entry with respect to client related information.

In operation 440, scripts are created for a single client. The scripts are created one at a time for the respective client to be onboarded. In an example, three to four scripts of different types may be generated for each client to be onboarded. A first script of a first type may be created for receiving a file, a second script of a second type may be created for processing the file, and a third script of a third type may be created for confirm processing. Although three scripts are described as being performed, more scripts may be required to be created.

In operation 450, the application development team identifies and allocates all of the required or corresponding files for executing the scripts created for the single client.

In operation 460, schedule is setup with an orchestrator for each script created for the single client. Accordingly, if three scripts are created, then three schedule setups may be performed. Similarly, if ten clients are to be onboarded, thirty to forty scripts may be created, and ninety to one hundred twenty schedule sets may be performed.

Upon scheduling of each of the scripts for the single client, operation 430, operation 440, operation 450 and operation 460 are repeated for subsequent clients to be onboarded.

Given the amount of operations performed, the onboarding of clients may lead to long lead times and require heavy utilization of resources, such as computing resources (e.g., processor utilization, memory utilization, and the like) as well as application developer resources.

Figure 5:
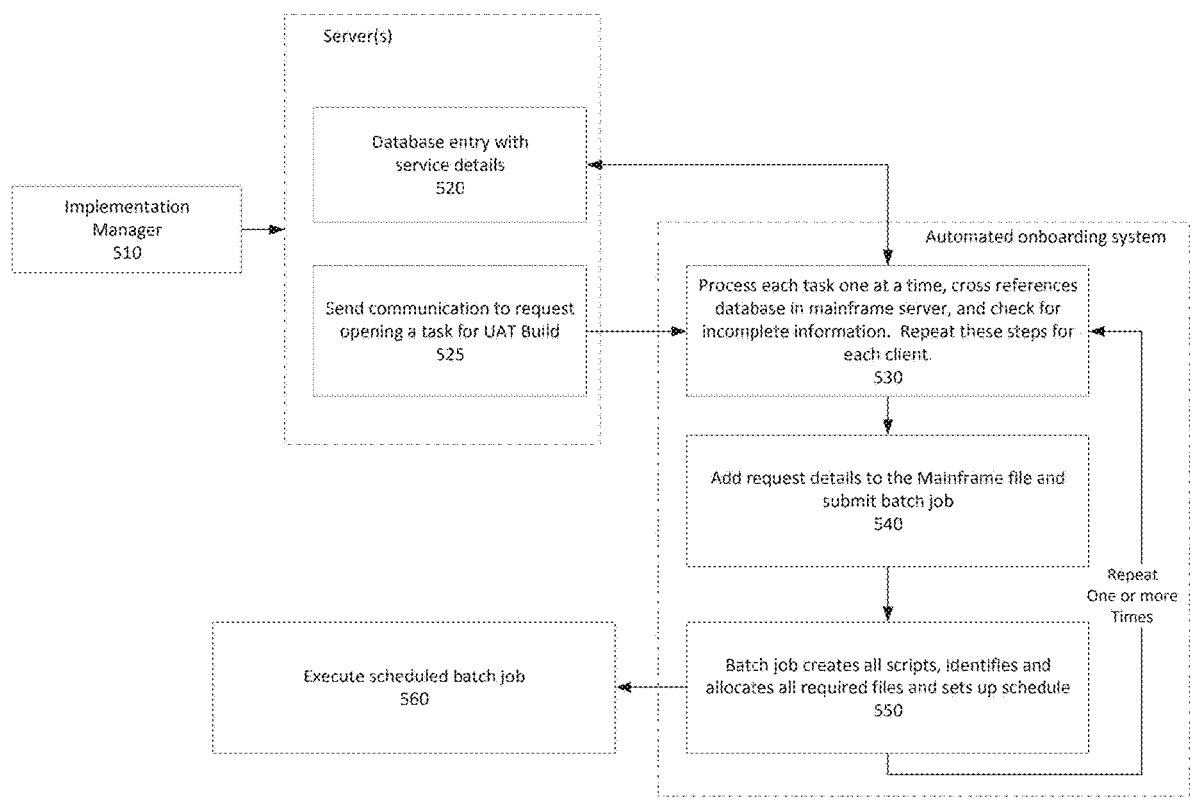
FIG. 5 illustrates a process flow for performing client onboarding in accordance with an exemplary embodiment.

FIG. 5 illustrates a process flow for performing client onboarding in accordance with an exemplary embodiment.

During a UAT build, a number of clients may be onboarded for testing a product (e.g., software, application, system of the like) to ensure that the built product conforms to the required specifications. Based on the product, number of clients to be onboarded may be numerous. Further, based on a size of an organization, number of products to be tested may also be large in number, further burdening technical resources of a respective organization.

FIG. 5 illustrates interactions between an implementation manager, one or more servers, and automated onboarding system for performing automated onboarding of clients in a UAT build.

Implementation manager 510 generates a request to onboard one or more clients for the UAT build, and transmits the generated request to one or more servers provided on a network. According to exemplary aspects, the generated request may be transmitted, via a communication, to one or more servers residing on a network. In an example, the communication sent may include an email, voice mail, text message, web based messaging, or the like. The one or more servers may include servers that may be configured to relay or transmit received communication to a database instance in a requested data format. In an example, the one or more servers may include an internal server mailbox. The one or more servers, in response to receiving the request communication from the implementation manager 510, may in turn may automatically generate the request communication to the database instance. In an example, a server residing on the network may include a processor, a memory or a database, and a communication circuit.

Further, one or more servers residing on the network may perform operation 520 to store information related to the request for onboarding the one or more clients. The operation 520 also may be executed in conjunction with operation 530 to further record or input service details associated with processing of tasks transmitted by the one or more servers residing on the network, such as the internal server mailbox. The service details may be added to the information related to the request for onboarding the one or more clients.

In an example, one or more servers residing on a network may perform operation 525. In operation 525, a request communication is generated and sent to the AOB system. In an example, the communication may include, without limitation, an email, a web-based communication, a text message, a voice message, or the like. The AOB system may include one or more computing components to perform operation 530, operation 540 and operation 550.

In operation 530, the AOB system process each task transmitted by the one or more servers. Each task is cross referenced with the information stored in one or more servers to check for incomplete information. Service details generated in response to processing of each task may then be provided to a database included in the one or more servers. In addition, operation 520 may be performed again to store the service details to the client related information entered previously. Operation 530 may repeat these steps for each client to be onboarded. However, aspects of the present disclosure are not limited thereto, such that the above noted steps may be performed contemporaneously in a batch processing. At least since operation 530 is performed repeatedly for each client to be onboarded without waiting for execution of subsequent operation 540 and operation 550, interactions between operation 530 and operation 520 may be performed more quickly in that no other operations are being performed therebetween.

Further, processing of each task may include generation of a client identifier (ID). For example, the client ID may include a predetermined number of characters (e.g., ten characters) and may be standardized to be in a predetermined format. A portion of the client ID may be allocated for routing information, and another portion of the client ID may include descriptive information for identification of the client ID by a user.

In operation 540, request details may be added to a mainframe or configuration file, and submitted as a batch job. In an example, request details may include, without limitation, time of request, requester information, organization information, priority information, routing information, subject of the request, and the like. The request details may be further added to the client ID. According to exemplary aspects, the mainframe or configuration file may be set to acquire client information associated with a task submitted to the AOB system for the UAT build for a certain period or duration of time. Upon expiration of the certain period or duration of time (e.g., eight hours), then the mainframe or configuration file including all of the client information collected prior to the expiration is closed from further collection, and submitted as a batch job. Client information collected after the expiration is included in a new mainframe or configuration file until the subsequent expiration of the certain period or duration of time.

Although the present disclosure provides sending the mainframe or configuration file as a batch job upon expiration of a certain period of time, aspects of the present disclosure are not limited thereto. For example, the mainframe or configuration file may be sent as a batch job based on a predetermined amount of client information received (e.g., number of clients to be onboarded).

In a different example, a machine learning (ML) algorithm may be utilized for determining when to finalize the mainframe or configuration file. Accordingly to exemplary aspects, the mainframe or configuration file may be set to collect client information based on certain attributes (e.g., priority information, organization information, or etc.) rather than based on an order or receipt until a predetermined threshold (e.g., time period, file size, or number of clients) is reached. Further, a size of the mainframe or configuration file to be submitted as a batch job may be adjusted in accordance with monitored system performance.

According to exemplary aspects, the predetermined threshold and/or the certain period or duration of time may be manually defined by a user by interacting with a user interface. In another exemplary embodiment, the predetermined threshold and/or the certain period or duration of time may correspond to an automatically determined value that is dynamically adjusted based on system performance, scheduled load, and the like. The predetermined threshold and/or the certain period or duration of time may be automatically determined and dynamically adjusted by using machine learning techniques consistent with disclosures in the present application.

Upon adjustment of such threshold or period/duration of time, a notification may be sent to one or more involved parties. In an example, such adjustments may be automatically implemented, or may be implemented upon receiving confirmation from an authorized personnel.

According to exemplary aspects, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, and the like. Further, machine learning analytical techniques may include reinforcement learning algorithms such as, for example, Markov Decision Process analysis, and the like.

Moreover, according to additional exemplary aspects, training models, such as, for example, a machine learning model to be further trained on additional data. Once the training model has been sufficiently trained, the sufficiently trained training model may be deployed onto various connected systems to be utilized. In an example, the training model may be determined to be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, machine learning models may be generated using at least one from among an artificial neural network technique, a decision tree technique, a support vector machines technique, a Bayesian network technique, and a genetic algorithms technique.

In operation 550, AOB system automatically generates all of the necessary scripts for the batch job. In an example, scripts may be job control language (JCL) scripts, or any other suitable scripts. The AOB system may generate the scripts in separate sets of different types, and in a particular sequence. For example, the AOB system may generate all of a first type of scripts as a set before generating any second type of scripts. Likewise, all of the second type of scripts may be generated before generating a third type of scripts. Upon generation of the scripts, all of the required files may be automatically identified and allocated. Then the generated scripts are scheduled for execution as a single batch job. In an example, one or more required or corresponding files may be automatically identified and allocated via a machine learning algorithm. According to exemplary aspects, the machine learning algorithm may identify corresponding files based on client or request attributes.

At least since the generated scripts are scheduled as a batch job, a single schedule setup may be performed. Further, in an example, the batch job may be scheduled based on time of input or based on one or more attributes, such as priority, requesting party, organization information or the like. In an example, the batch job may be automatically scheduled via a machine learning algorithm, which may schedule execution of the batch job along with other tasks based on priority information, calculated efficiency, system performance, and the like. A more detailed description of the batch job generation process may be provided in the description of FIG. 7 below.

In operation 560, the scheduled batch job is executed to onboard all of the clients included in the batch job for the UAT build.

Although batch jobs are described as being defined by requests received during a specific time frame, aspects of the present disclosures are not limited thereto, such that batches may be formed for execution based on attributes of the requests received, relationship between the requests received, predetermined number of requests of the like. Further, differently sized batches may be formed based on attributes to provide a more efficient onboarding process.

Figure 6:
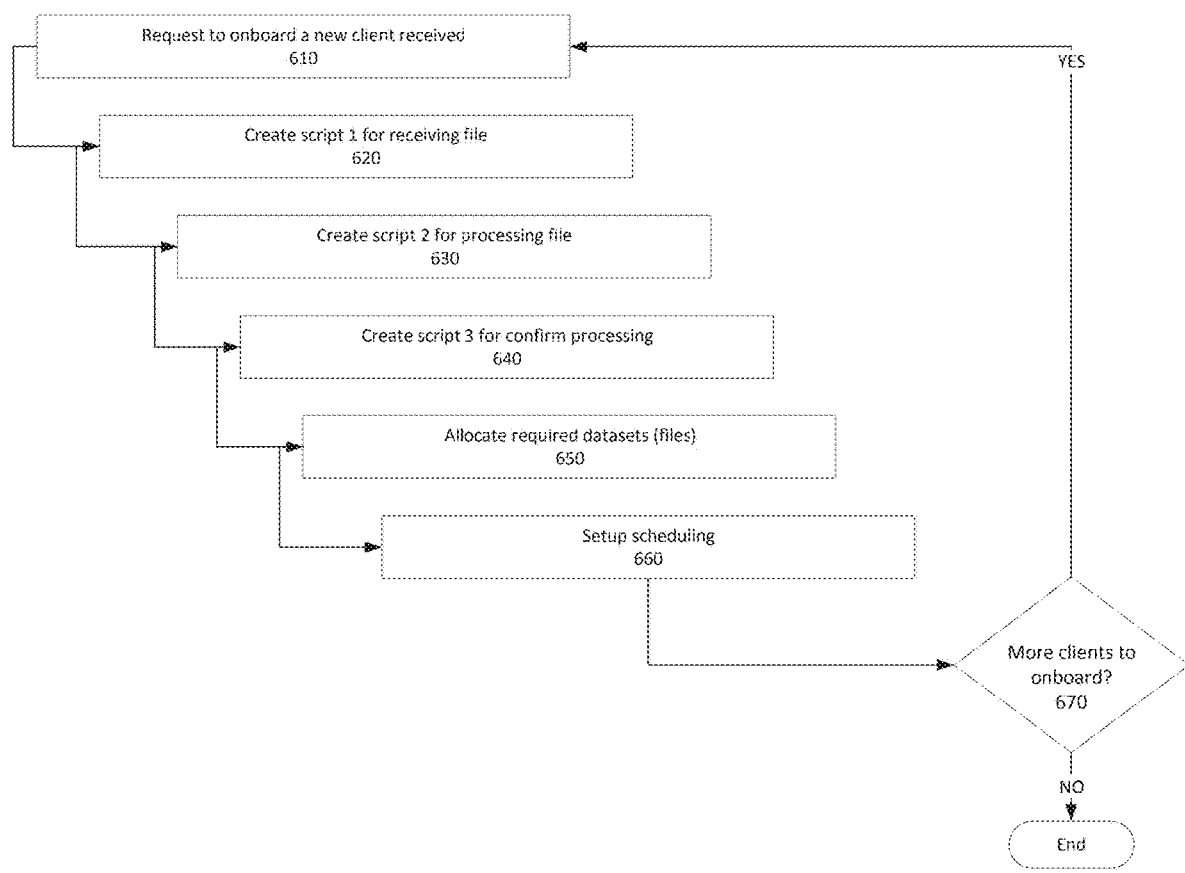
FIG. 6 illustrates a conventional method of generating scripts for client onboarding, which may be repeated for each client to be onboarded.

FIG. 6 illustrates a conventional method for performing script generation for a client onboarding, which may be repeated for each client onboarding.

As provided in FIG. 6, performing onboarding of new clients in the relevant art requires a number of operations to be performed, and is manually intensive. As illustrated in FIG. 6, onboarding of a single client may include at least six steps, and potentially more. Accordingly, onboarding of fifty clients may require at least three hundred steps, which may utilize large amount of computing resources (e.g., CPU and/or memory utilization). Further, the scripts, which may be three or four on average based on services requested or required, may be generated manually in the relevant art. Each of the scripts may be manually scripted by an implementer or an application development team member. Even if a template is utilized, the implementer may select options based off of the generated client onboarding request to generate a script. This process may be repeated based on the number of scripts required. Afterwards, the implementer would then identify all of the required files, and then allocate the files. The implementer would then add the scripts to the schedule.

In operation 610, a request to onboard a new client, such as Client 1 is received. The request may be received and processed for one client at a time after necessary scripts are created, corresponding files are identified and allocated, and the created scripts are scheduled for execution. For example, once all of the scripts necessary for onboarding Client 1 is created, corresponding files are then identified and allocated, and each of the scripts are sequentially scheduled for execution, then another request to onboard another new client, such as Client 2 is received and processed. Each of the scripts may be manually generated by an application developer team.

In operation 620, a first script of a first type is created. The first type of script may be a script for receiving a file.

In operation 630, a second script of a second type is created. The second type of script may be a script for receiving the file.

In operation 640, a third script of a third type is created. The third type of script may be a script for confirming processing of the scripts. Although three scripts are disclosed as being created for execution, aspects of the present disclosure are not limited thereto, such that more scripts may be sequentially created for execution.

In operation 650, all of the required or corresponding datasets/files are identified and allocated after all of the necessary scripts for onboarding the single client are generated. In an example, identification and allocation of required or corresponding datasets/files may be manually performed by an application developer team.

In operation 660, schedule is set for onboarding the new client. Each of the scripts may be manually scheduled one at a time. More specifically, the first script is scheduled, then the second script is scheduled, and then the third script is scheduled.

In operation 670, a check is performed to determine if more clients are to be onboarded. If it is determined that more clients are to be onboarded, each of operation 610, operation 620, operation 630, operation 640, operation 650 and operation 660 is performed for the subsequent client to be onboarded, such as Client 2. Upon execution of the operation 610, operation 620, operation 630, operation 640, operation 650 and operation 660, another check is performed to determine if more clients are to be onboarded. The above noted operations are repeated for each client that is to be onboarded. Accordingly, if fifty clients are to be onboarded, then the operation 610, operation 620, operation 630, operation 640, operation 650, operation 660 and operation 670 will be consecutively run for fifty iterations. For larger organizations, these numbers may be much larger.

Figure 7:
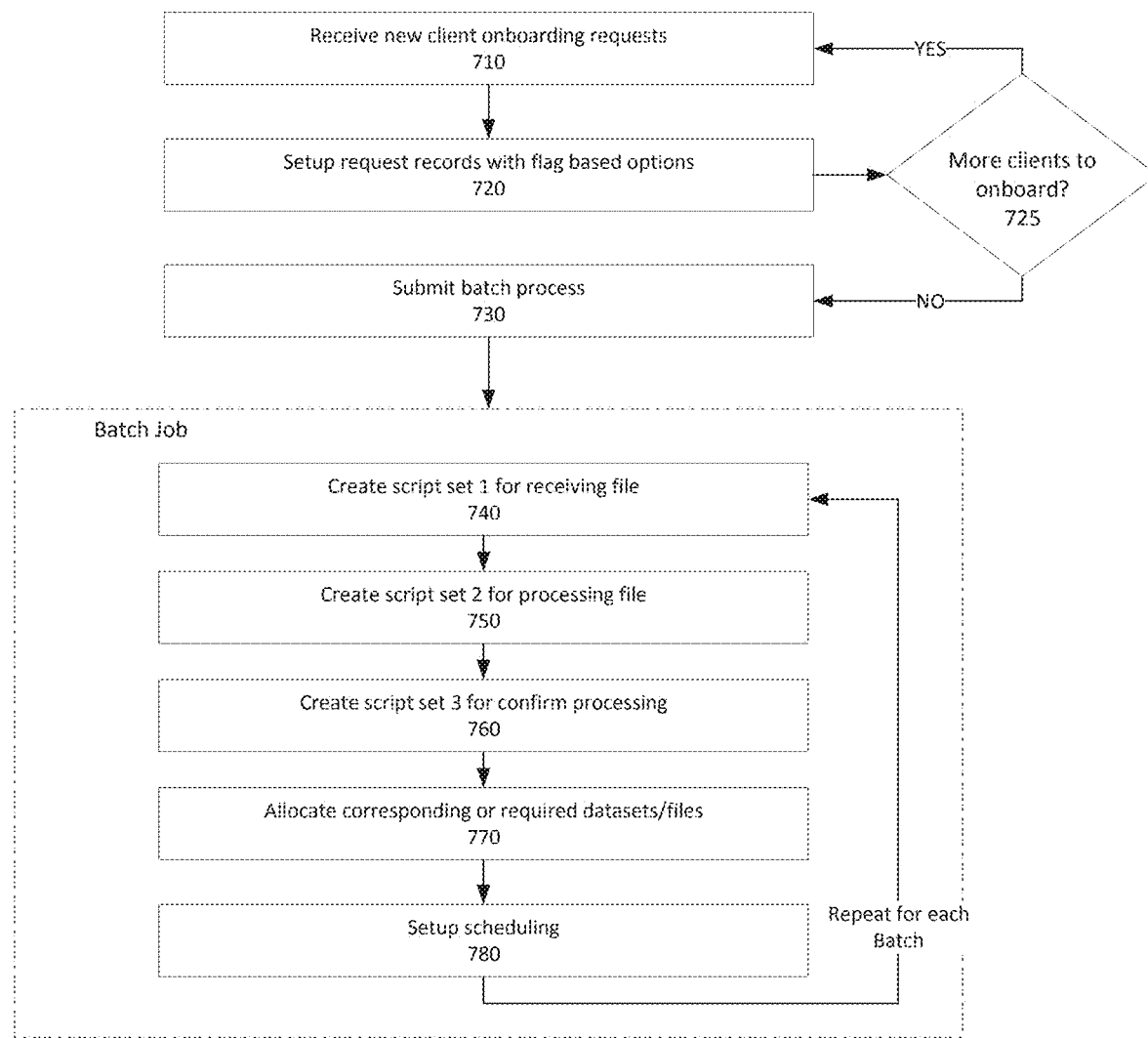
FIG. 7 illustrates a method for performing client onboarding script generation in accordance with an exemplary embodiment.

FIG. 7 illustrates a method for performing script generation in accordance with an exemplary embodiment.

As illustrated in FIG. 7, all of the operations of creation or generation of scripts (e.g., JCLs), identification and allocation of corresponding or required datasets/files, and scheduling of a batch job of scripts may be performed just once for the batch of clients to be onboarded. Accordingly, instead of performing numerous operations for each client to be onboarded in multiple iterations for the clients to be onboarded, the respective operations may be performed just once for the batch of clients. For example, if fifty clients are to be onboarded, once relevant first script set 1 is generated, first script 1 does not have to be generated again after creating a second script set 2 and a third script set 3. Thus, one iteration of set of operations would be performed for the batch of clients to be added, rather than performing one iteration for each client, for a total of fifty iterations in the example of fifty clients, as illustrated in FIG. 6.

In operation 710, a new client onboarding request is received for onboarding processing.

In operation 720, a request record with flag based options is setup for the new client onboarding request. Accordingly to exemplary aspects, a request record may be setup for each new client onboarding request that is received. Upon completion of operation 720, a check is performed in operation 725 to determine if there are any more new clients are to be onboarded. If it is determined that there are more clients are to be onboarded, then the method proceeds back to operation 710. On the other hand, if it is determined that there are no more clients to be onboarded, then the method proceeds to operation 730.

In operation 730, the client onboarding requests received in operation 710 and the records setup in operation 720 are aggregated and sent for batch processing. In an example, the requests to onboard new clients received within a specified period of time may be sent for batch processing. For example, all of the requests received between 2:00 PM and 10:00 PM may aggregated for batch processing, and requests received after the specified period of time may be aggregated for subsequent batch processing.

Once submitted for batch processing, a batch job is generated by performing each of operation 740, operation 750, operation 760, operation 770 and operation 780. The operation 740, operation 750, operation 760, operation 770 and operation 780 may be performed for each batch job to be performed. The batch job processing may be performed automatically without manual intervention.

In operation 740, a first script set 1 of a first type is created or generated for the batch of client onboarding requests received during the specified period of time. The first script set 1 of the first type may be scripts for receiving a file.

In operation 750, a second script set 2 of a second type is created or generated for the batch of client onboarding requests received during the specified period of time. The second script set 2 of the second type may be scripts for processing the file.

In operation 760, a third script set 3 of a third type is created or generated for the batch of client onboarding requests received during the specified period of time. The third script set 3 of the third type may be scripts for confirming processing.

In operation 770, all of the corresponding or required datasets/files for the created script sets are identified and allocated based on attributes of the generated scripts. The identification and allocation of the corresponding or required datasets/files may be performed automatically by the AOB system using a machine learning algorithm based on one or more machine learning models. In an example, the machine learning algorithm may identify corresponding files based on client attributes, request attributes, and/or flag based options selected for the request records.

In operation 780, the prepared batch job including all of the scripts created therein is setup for scheduling. In an example, at least since the batch job is scheduled for execution, the scheduling of the batch job may be performed just once instead of multiple iterations. In an example, scheduling of the batch job may be performed based on an order of input or according to a machine learning algorithm based on one or more machine learning models. For example, batches may be scheduled based on system resource availability, priority of the batch to be processed, attributes of the scripts included in the batch and the like.

At least since a group of clients may be onboarded in a single batch job, the above noted operations may be performed just once for onboarding of the batch of clients. For example, if a batch of fifty clients is to be onboarded, a single iteration of each of operation 740, operation 750, operation 760, operation 770 and operation 780 may be performed for the batch of clients, as opposed to performing fifty iterations or more. Accordingly, amount of processing may be reduced to conserve processing and memory resources, as well as personnel resources, with quicker UAT builds. Once UAT is satisfactorily setup or built, the setup information and/or configuration move into production to process daily transactions, including the client onboarding process.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing automated onboarding of a plurality of clients in a user acceptance testing (UAT) setup, the method comprising:
   receiving a request to onboard the plurality of clients for setting up the UAT;
   receiving an onboarding task for each of the plurality of clients, wherein each of the plurality of onboarding tasks corresponds to each of the plurality of clients;
   receiving a plurality of files corresponding to a plurality of scripts for onboarding the plurality of clients; and
   executing, based on a schedule, one batch job comprising the plurality of scripts to onboard the plurality of clients for the setting up the UAT, wherein executing the one batch job comprises executing the plurality of scripts in the one batch job based on the plurality of files and a mainframe file associated with the plurality of onboarding tasks and clients, wherein:
      each of the plurality of clients has a respective client identifier, and
      all of the scripts are in separate sets of different types and are in a particular sequence within the one batch job.

2. The method according to claim 1, wherein the one batch job further includes a plurality of request records containing flag-based options for the plurality of clients.

3. The method according to claim 2, wherein at least one of the scripts is associated with the flag-based options.

4. The method according to claim 1, wherein the method further comprises receiving a batch job file.

5. The method according to claim 1, wherein the plurality of scripts is executed only once for the one batch job.

6. The method according to claim 1, wherein the plurality of files corresponding to the plurality of scripts are associated with a machine learning algorithm.

7. The method according to claim 1, wherein a size of the one batch job is based on a number of requests for onboarding clients received within a predetermined period of time.

8. The method according to claim 1, wherein a size of the one batch job is based on a machine learning algorithm.

9. The method according to claim 1, wherein the schedule is based on a machine learning algorithm.

10. The method according to claim 1, further comprising:
    storing, in a database, service details for each of the plurality of clients to be onboarded.

11. The method according to claim 10, wherein the service details include, for each of the plurality of clients at least the respective client identifier.

12. The method according to claim 11, wherein each respective client identifier includes a routing number.

13. The method according to claim 11, wherein each respective client identifier includes a predetermined number of characters.

14. The method according to claim 1, wherein all of the scripts are job control language (JCL) scripts.

15. The method according to claim 1, wherein a plurality of batch jobs are executed in a day based on the schedule.

16. A system for performing automated onboarding of a plurality of clients in a user acceptance testing (UAT) setup, the system comprising:
    at least one processor;
    at least one memory; and
    at least one communication circuit, wherein the at least one processor is configured to:
      receive a request to onboard the plurality of clients for setting up the UAT;
      receive an onboarding task for each of the plurality of clients, wherein each of the plurality of onboarding tasks corresponds to each of the plurality of clients;
      receive a plurality of files corresponding to a plurality of scripts for onboarding the plurality of clients; and
      execute, based on a schedule, one batch job comprising the plurality of scripts to onboard the plurality of clients for the setting up the UAT, wherein executing the one batch job comprises executing the plurality of scripts in the one batch job based on the plurality of files and a mainframe file associated with the plurality of onboarding tasks and clients, wherein:
        each of the plurality of clients has a respective client identifier, and
        all of the scripts are in separate sets of different types and are in a particular sequence within the one batch job.

17. The system according to claim 16, wherein the plurality of files corresponding to the plurality of scripts are associated with a machine learning algorithm.

18. The system according to claim 16, wherein a size of the one batch job is based on a number of requests for onboarding clients received within a predetermined period of time.

19. A non-transitory computer readable storage medium that stores a computer program for performing automated onboarding of a plurality of clients in a user acceptance testing (UAT) setup, the computer program, when executed by a processor, causing a system to execute a process comprising:
- receiving a request to onboard the plurality of clients for setting up the UAT;
- receiving an onboarding task for each of the plurality of clients, wherein each of the plurality of onboarding tasks corresponds to each of the plurality of clients;
- receiving a plurality of files corresponding to a plurality of scripts for onboarding the plurality of clients; and
- executing, based on a schedule, one batch job comprising the plurality of scripts to onboard the plurality of clients for the setting up the UAT, wherein executing the one batch job comprises executing the plurality of scripts in the one batch job based on the plurality of files and a mainframe file associated with the plurality of onboarding tasks and clients, wherein:
  - each of the plurality of clients has a respective client identifier, and
  - all of the scripts are in separate sets of different types and are in a particular sequence within the one batch job.

20. The non-transitory computer readable storage medium according to claim 19, wherein all of the scripts are job control language (JCL) scripts.

* * * * *